United States Patent [19]

Flanagan

[11] 4,395,593

[45] Jul. 26, 1983

[54] ACOUSTIC DIFFERENTIAL DIGITAL CODER

[75] Inventor: James L. Flanagan, Warren, N.J.

[73] Assignee: Bell Telephone Laboratories, Incorporated, Murray Hill, N.J.

[21] Appl. No.: 288,790

[22] Filed: Jul. 31, 1981

Related U.S. Application Data

[63] Continuation of Ser. No. 97,808, Nov. 27, 1979, abandoned.

[51] Int. Cl.[3] .......... H04M 1/00; H04R 3/00; H04R 19/00; H04R 23/00

[52] U.S. Cl. .......... 179/1 F; 179/1 R; 179/111 E; 179/121 R

[58] Field of Search .......... 179/1 R, 1 F, 111 R, 179/111 E

[56] References Cited

U.S. PATENT DOCUMENTS

| | | | |
|---|---|---|---|
| 3,286,032 | 11/1966 | Baum | 179/138 |
| 3,622,791 | 11/1971 | Bernard | 179/138 |
| 3,626,096 | 12/1971 | Von Muench et al. | 179/1 |
| 4,194,095 | 3/1980 | Doi et al. | 179/113 |

FOREIGN PATENT DOCUMENTS

| | | | |
|---|---|---|---|
| 104293 | 10/1926 | Austria | 179/111 R |
| 1382927 | 2/1975 | United Kingdom | 179/110 A |

*Primary Examiner*—George G. Stellar
*Attorney, Agent, or Firm*—Jack Saul Cubert; Kurt C. Olsen

[57] ABSTRACT

An arrangement for directly converting speech waves into coded digital signals includes a vibratory diaphragm secured at an aperture in a closed chamber. The diaphragm vibrates responsive to the difference between the speech waves and sound waves radiated into the chamber from a digital signal to sound converter through a second aperture. Apparatus connected to the diaphragm generates a quantized signal responsive to the diaphragm motion and a digital code generator produces a sequence of digital coded signals corresponding to the quantized signals. The coded signals from the digital code generator are delayed and supplied to the sound converter whereby a differential pulse code modulated signal representative of the speech waves is produced.

23 Claims, 9 Drawing Figures

ACOUSTIC DIFFERENTIAL DIGITAL CODER

This is a continuation, of application Ser. No. 97,808, filed Nov. 27, 1979 now abandoned.

BACKGROUND OF THE INVENTION

My invention relates to digital communication arrangements and, more particularly, to the conversion of acoustic waves into digitally coded signals.

In digital communication systems, intelligence is generally conveyed in the form of pulse codes. Advantageously, the use of pulse codes permits the multiplexing of different types of signals on one communication channel. Consequently, data, video, and audio signals may be transmitted over a single digital facility. The transmission of an audio signal over the digital facility requires conversion of input acoustic waves to the digital code format of the facility. At every station of the facility, complex electronic circuitry is needed to filter, sample, digitize and encode each audio signal. The cost and complexity of the audio signal conversion circuitry has led to the development of transducers adapted to directly convert acoustic waves into digitally coded signals.

Digital microphones such as those disclosed in U.S. Pat. Nos. 3,286,032 issued Nov. 15, 1966, 3,622,791 issued Nov. 23, 1971, and 3,626,096 issued Dec. 7, 1971 are readily adapted to provide PCM coded signals directly from acoustic waves. U.S. Pat. Nos. 3,622,791 and 3,286,032 also disclose arrangements for obtaining delta modulation codes directly from acoustical waves by means of special signal difference detection arrangements. There are other forms of pulse code modulation, however, which provide improved transmission characteristics for speech signals. Differential pulse code modulation, as is well known in the art, provides a significant improvement in signal-to-noise ratio over PCM and delta modulation schemes, and adaptive differential pulse code modulation schemes exhibit even better signal-to-noise ratio characteristics. The aforementioned patents, however, do not provide arrangements that take advantage of the improved differential pulse code modulation characteristics. It is an object of the invention to provide direct acoustical to digital code conversion with improved signal transmission characteristics.

SUMMARY OF THE INVENTION

The invention is an arrangement for converting sounds into coded digital signals having a closed chamber with at least first and second apertures therein. A vibratory diaphragm covers the first aperture of the chamber and a digital signal to sound-wave converter is secured to the chamber to cover the second aperture. The diaphragm vibrates responsive to the difference between the sound waves from a source outside the chamber and the sound waves radiated into the chamber from the digital signal to sound-wave converter. Apparatus connected to the diaphragm generates a quantized electrical signal responsive to the diaphragm vibrations, and a digital code generator produces a sequence of digital coded signals corresponding to the quantized electrical signal. The digital coded signals from the digital signal generator are applied to the digital signal to sound-wave converter whereby the generated digital coded signals correspond to the difference between sound waves from the sound source and the sound waves from the digital signal to sound-wave converter.

DETAILED DESCRIPTION

Figure 1:
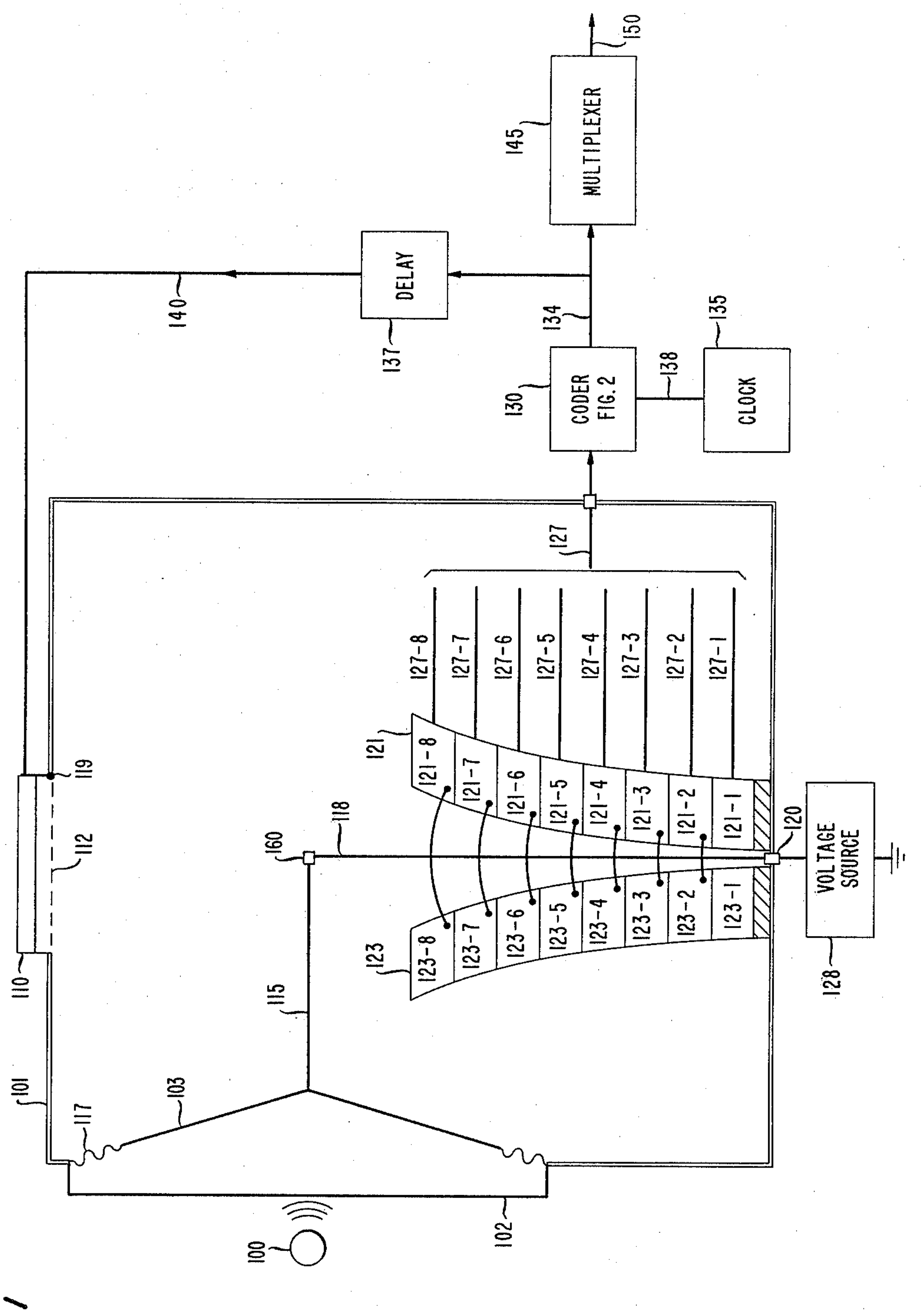
FIG. 1 depicts a differential digital signal coding arrangement illustrative of the invention.

FIG. 1 shows a differential pulse code modulator illustrative of the invention. The modulator of FIG. 1 includes chamber 101 having first aperture 117 and second aperture 119 therein. Vibratory diaphragm 103 is peripherally fastened to chamber 101 so that it covers aperture 117. Aperture 119 is covered by resistive screen 112 which may be of silk or other suitable material. Digital signal to sound-wave transducer 110 has its periphery secured to the portion of chamber 101 surrounding aperture 119 so that only sound waves from transducer 110 are radiated into chamber 101 through aperture 119. In this way, vibratory diaphragm 103 is responsive only to sound waves entering aperture 117 from sound source 100 and to sound waves entering aperture 119 from transducer 110 and resistive screen 112. An acoustic filter adapted to limit the frequency range of sound waves from source 100 is attached to chamber 101 around diaphragm 103. Acoustic filter 102 may be of the type described in my copending application Ser. No. 963,926 filed Nov. 27, 1978. As disclosed therein, filter 102 is operative to remove frequency components of sound waves at and above one-half the sampling frequency of the differential pulse code modulator of FIG. 1.

The center of diaphragm 103 is connected to the left end of linkage wire 115. The right end of wire 115 is attached to post 160 at the upper end of conductive ribbon 118. The lower end of ribbon 118 is fixedly attached to closed chamber 101 at support 120. Movable ribbon 118 is elastically deflected responsive to the vibratory motion of diaphragm 103 and may be constructed of a relatively stiff metal so that the deflection is proportional to the sound pressure on the diaphragm. The lower end of fixed post members 121 and 123 are attached to chamber 101 at equal distances from ribbon support 120.

Fixed members 121 and 123 are symmetrically bent away from the undeflected position of ribbon 118 so that the spacing between the undeflected ribbon and the fixed members becomes greater as the distance from support 120 increases. As shown in FIG. 1, each of members 121 and 123 is divided into eight conductive segments. When diaphragm 103 moves to the right responsive to sound pressure thereon, ribbon 118 is deflected to the right and a portion of the ribbon is placed in contact with one or more segments of curved member 121. Each segment is a proximity detector of predetermined length. A slight deflection will cause the lowest portion of ribbon 118 to contact segment 121-1. As the deflection is increased, the length of contact between ribbon 118 and member 121 increases so that both segments 121-1 and 121-2 are simultaneously placed in contact with ribbon 118. As the deflection increases further, more segments of member 121 are brought into contact with ribbon 118. At its rightmost deflection limit, ribbon 118 is in conductive contact with all of the segments of member 121. Deflection to the left of ribbon 118 in response to the motion of diaphragm 103 brings the ribbon into contact with one or more segments of curved member 123.

Voltage source 128 is connected to conductive ribbon 118 in chamber 101 through support 120 by connection arrangements well known in the art. Each segment of member 121 is separately connected to a wire of cable 127 which cable exits chamber 101 through a sealed aperture in the wall thereof. The other end of cable 127 is connected to coder 130. Segment 121-1 is connected to wire 127-1 of cable 127. Similarly the remaining segments of member 121 are connected via wires 127-2 through 127-8. Each segment of member 123, except segment 123-1, is connected to the corresponding segment of member 121. The deflection of ribbon 118 causes the voltage signal +V from source 128 to be applied to the conductive segments of members 121 and 123 with which ribbon 118 is in contact. Thus, the zero and +V voltage outputs from the segments of 121 and 123 provide a quantized signal on cable 127 which quantized signal is responsive to the motion of diaphragm 103.

Coder 130 receives the quantized signals applied to members 121 and 123 through the deflection of ribbon 118 via cable 127. Responsive to the quantized signal, coder 130 produces a sequence of digital coded signals at a rate determined by sampling clock 135. Where speech is applied to diaphragm 103 from source 100, the bandwidth of the sound waves is limited to 4 KHz by filter 102. Sampling clock 135 may be set to sample the quantized signal at an 8 KHz rate as is well known in the art. Each coded signal from coder 130 corresponds to the position of ribbon 118 at a sampling instant. The ribbon position is quantized by the voltage output obtained from the conductive post segments via cable 127. Table 1 illustrates the codes obtained from coder 130 responsive to the level signals applied via cable 127.

TABLE 1

| Contacted Segments | Quantized Level | Code |
|---|---|---|
| 121-1 to 121-8 | +7 | 1111 |
| 121-1 to 121-7 | +6 | 1110 |
| 121-1 to 121-6 | +5 | 1101 |
| 121-1 to 121-5 | +4 | 1100 |
| 121-1 to 121-4 | +3 | 1011 |
| 121-1 to 121-3 | +2 | 1010 |
| 121-1 to 121-2 | +1 | 1001 |
| 121-1 | 0 | 1000 |
| 123-1 | 0 | 0000 |
| 123-1 to 123-2 | −1 | 0001 |
| 123-1 to 123-3 | −2 | 0010 |
| 123-1 to 123-4 | −3 | 0011 |

TABLE 1-continued

| Contacted Segments | Quantized Level | Code |
|---|---|---|
| 123-1 to 123-5 | −4 | 0100 |
| 123-1 to 123-6 | −5 | 0101 |
| 123-1 to 123-7 | −6 | 0110 |
| 123-1 to 123-8 | −7 | 0111 |

Figure 2:
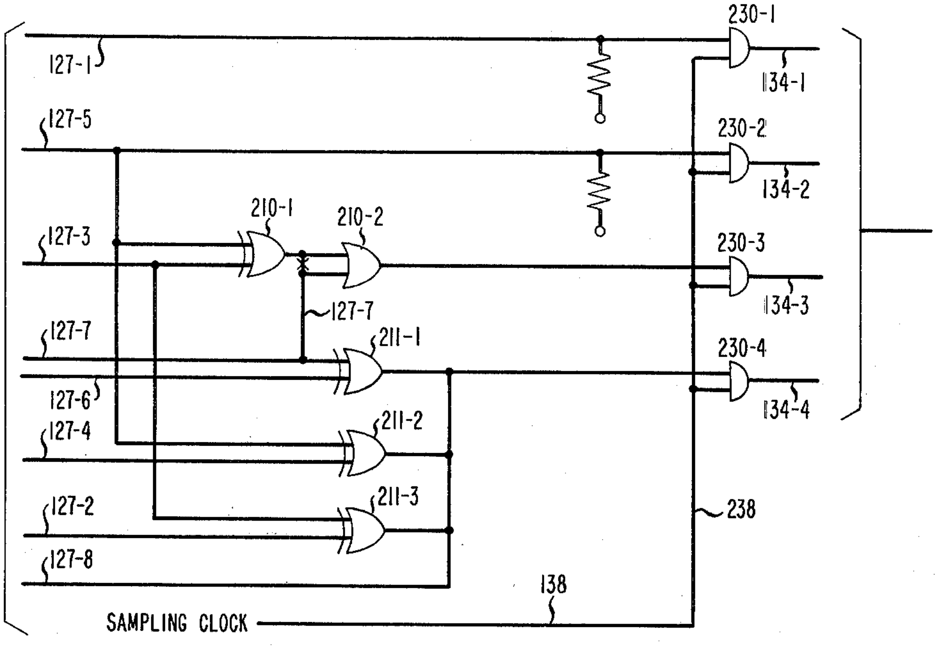
FIG. 2 shows a block diagram of the digital coder used in FIG. 1.

Coder 130 is shown in greater detail in FIG. 2. Referring to FIG. 2, lead 127-1 connects segment 121-1 to an input of AND-gate 230-1. Lead 127-5 connects conductive segment 121-5 to an input of AND-gate 230-2. Conductive segments 121-3 and 121-5 are connected to an input of AND-gate 230-3 via exclusive OR-gate 210-1. Conductive segment 121-7 is also connected via OR-gate 210-2 to the same input of AND-gate 230-3. Segments 121-2 and 121-3 are connected to an input of AND-gate 230-4 via exclusive OR-gate 211-3. Similarly, segments 121-4 and 121-5 are logically coupled to an input of AND-gate 230-4 via exclusive OR-gate 211-2, and segments 121-6 and 121-7 are logically coupled to gate 230-4 via exclusive OR-gate 211-1. Segment 121-8 is connected to gate 230-4 via lead 127-8. Each of AND-gates 230-1 through 230-4 receives periodic sampling pulses from clock 135 via lead 138 so that AND-gates 230-1 through 230-4 provide a sequence of coded signals responsive to the quantized deflection of ribbon 118.

In FIG. 2, the output of gate 230-1 on lead 134-1 represents the sign bit of each coded signal, and it is shown as the first (left most) bit in the code column of Table 1. The output of gate 230-2 on lead 134-2 is the second bit in the codes of Table 1. Gate 230-3 produces the third bit in the codes of Table 1, while gate 230-4 provides the fourth (right most) bit of the codes in Table 1.

Gate 230-1 receives a +V signal via lead 127-1 when ribbon 118 is in contact with conductive segment 121-1 so that the first (sign) bit of the coded output of coder 130 is a 1 for all positive quantized levels on cable 127 in FIG. 1. When ribbon 118 is deflected to the left, gate 230-1 is never enabled whereby the first bit from coder 130 is zero for all negative quantized levels. Gate 230-2 is enabled by a +V signal obtained from conductive segment 121-5. Consequently, the second bit from coder 130 is obtained for levels +4 through +7 and −4 through −7 in Table 1.

Exclusive OR-gate 210-1 is activated when segment 121-3 but not segment 121-5 is contacted by ribbon 118, or segment 121-7 is contacted by the ribbon. Consequently, gate 230-3 provides a 1 output for the +2, +3, +6 and +7 and −2, −3, −6, and −7 quantized levels of Table 1. The fourth bit from coder 130 is obtained from gate 230-4 which is enabled by exclusive OR-gate 211-3 if segment 121-2 but not segment 121-3 is contacted by the ribbon, or by exclusive OR-gate 211-2 if segment 121-4 but not segment 121-5 is contacted by the ribbon or by exclusive OR-gate 211-1 if segment 121-6 but not segment 121-7 is contacted by the ribbon. Gate 230-4 is also enabled when segment 121-8 is reached by ribbon 118. Thus gate 230-4 is enabled by the quantized levels +1, +3, +5 and +7 and −1, −3, −5 and −7 as shown in Table 1.

Deflection of ribbon 118 to the right so that it is in contact with segments 121-1 through 121-5, for example, causes a +V signal to appear on leads 127-1 through 127-5. The +V signal on segment 121-1 is applied to one input of gate 230-1 and the +V signal on segment 121-5 is applied to one input of gate 230-2. The +V signals from segments 121-2 and 121-3 inhibit exclusive OR-gate 211-3, while the +V signals on segments 121-4 and 121-5 inhibit exclusive OR-gate 211-2. Consequently, there is no enabling input to gate 230-4. Gate 230-3 does not receive an enabling input since the +V signals on leads 127-3 and 127-5 inhibit exclusive OR-gate 210-1, and a zero signal is present on lead 127-7.

A sampling clock pulse applied to gates 230-1 through 230-4 via lead 238 causes gates 230-1 and 230-2 to provide one outputs while gates 230-3 and 230-4 supply zero outputs. Thus, the coded signal 1100 is obtained for the quantized level +4 from cable 127. If ribbon 118 swings to the left to cover segments 123-1 through 123-5 at the time of the next sampling clock pulse from clock 135, the outputs of gates 230-1 through 230-4 provide the 0100 code corresponding to the −4 quantized level signal from cable 127.

As is readily seen from FIG. 1, the sequence of codes obtained from coder 130 corresponds to the vibratory motion of diaphragm 103 as transmitted to ribbon 118. The output of coder 130 in FIG. 1 is supplied to multiplexer 145 and to unit code delay 137. Multiplexor 145, as is well known in the art, rearranges the sequence of codes from coder 130 into the format required for transmission over communication channel 150. Delay 137 is operative to supply the sequence of codes from coder 130 to converter 110 after a delay of one code sampling period.

Sound-wave converter 110 receives the sequence of coded signals from coder 130 via one code delay 137 and produces responsive thereto sound waves corresponding to the code sequence. The sound waves are radiated into chamber 101 through resistive screen 112. Chamber 101 and the resistive screen 112 cooperate to integrate the sound waves from converter 110 and, in effect, provide the acoustical equivalent of a first order predictor well known in the art.

Figure 3:
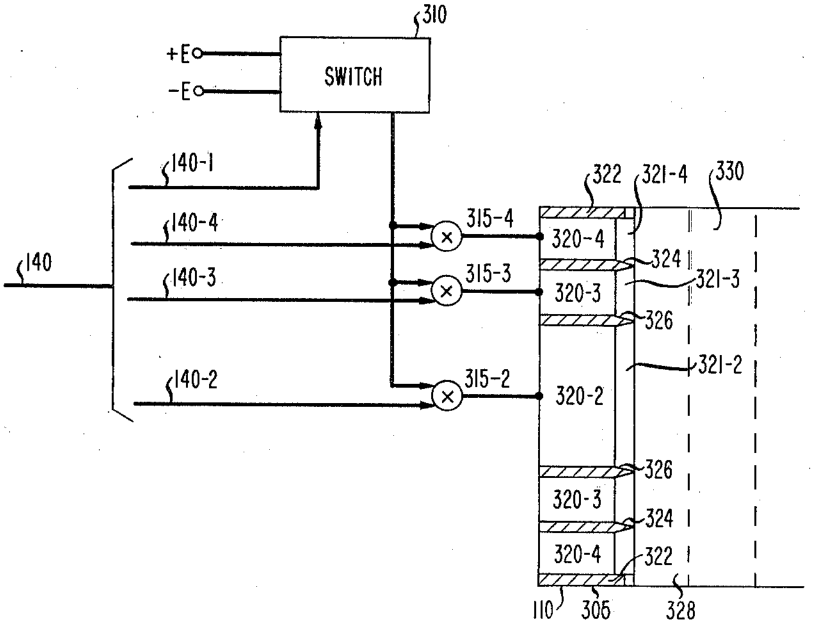
FIG. 3 shows a digital signal to sound-wave converter useful in the arrangement of FIG. 1.

Converter 110 is shown in greater detail in FIG. 3. Referring to FIG. 3, converter 110 includes a cylindrical electret arrangement including concentric ring electret 321-4 surrounding concentric ring electret 321-3 which in turn surrounds cylindrical electret 321-2. Electret 321-2 is separated from electret 321-3 by cylindrical wall 326 and electret 321-4 is separated from electret 321-3 by cylindrical wall 324. Converter 110 further includes acoustic filter section 330 which may be of the type described in my aforementioned copending application. Acoustical filter 330 is adapted to remove frequency components of the acoustic waves from electrets 321-2, 321-3, and 321-4 at and above the sampling frequency set by sampling clock 135.

Lead 140-1 from cable 140 applies the delayed sign bit output of coder 130 to analog switch 310. Responsive to a one bit on lead 140-1, switch 310 connects the +E voltage input thereto to each of switches 315-2, 315-3, and 315-4. Leads 140-2 through 140-4 carry pulse signals corresponding to the outputs of gates 230-2, 230-3, and 230-4 in coder 130. Switch 315-2 is operative to pass the +E voltage signal from switch 310 to conductive element 320-2 when a pulse is applied to lead 140-2. The +E voltage signal from switch 315-2 causes a pulse-like sound wave of one polarity (e.g. positive) to be emitted from electret section 321-2. Cylindrical wall 326 isolates the sound pulse wave from section 321-2 from waves that emanate from electret sections 321-3 and 321-4. In like manner, the application of a one signal on lead 140-1 and a one signal on lead 140-3 results in switch 315-3 closing and a positive polarity sound wave pulse from electret section 321-3. Similarly, a one signal on each of leads 140-1 and 140-4 results in a positive polarity sound wave emanating from electret section 321-4.

When a 1100 code is supplied from cable 140, electret section 321-2 generates a positive polarity sound wave. A 0100 signal on cable 140 results in a negative polarity sound wave from electret section 321-2. Other code combinations selectively activate the electret sections of converter 110 so that the sound wave produced therefrom is proportional to the quantized level signals on cable 127 delayed by passage through coder 130 and one code delay 137. The outputs of electret sections 321-2, 321-3, and 321-4 are separated by walls 324 and 326.

As is readily seen from FIG. 3 the surface areas of electrets 321-2, 321-3, and 321-4 are selected to be ratios of two to one whereby the sound wave magnitude from section 321-2 is twice that of the sound wave from 321-3 and the sound wave from 321-3 is twice that from section 321-4. In this way the pulse type sound waves are weighted in accordance with the bit positions of the codes from delay 137. The pulse type sound waves from the electret sections of converter 110 are summed in section 328 of converter 110 and the resulting sound wave sum is low-pass filtered in section 330 as aforementioned.

Vibratory diaphragm 103 is responsive to the differential pressure in chamber 101 of FIG. 1 which differential pressure is the result of sound waves from external source 100 and the sound waves radiated into the chamber from converter 110. The deflection of conductive ribbon 118 is thereby made responsive to the difference between the acoustic waves applied from source 100 and acoustic waves representative of the previous signals from source 100 applied from the output of converter 110. The output of coder 130 supplied to multiplexor 145 corresponds to a differential pulse code modulated signal respresentative of the sound wave input from source 100.

Figure 4:
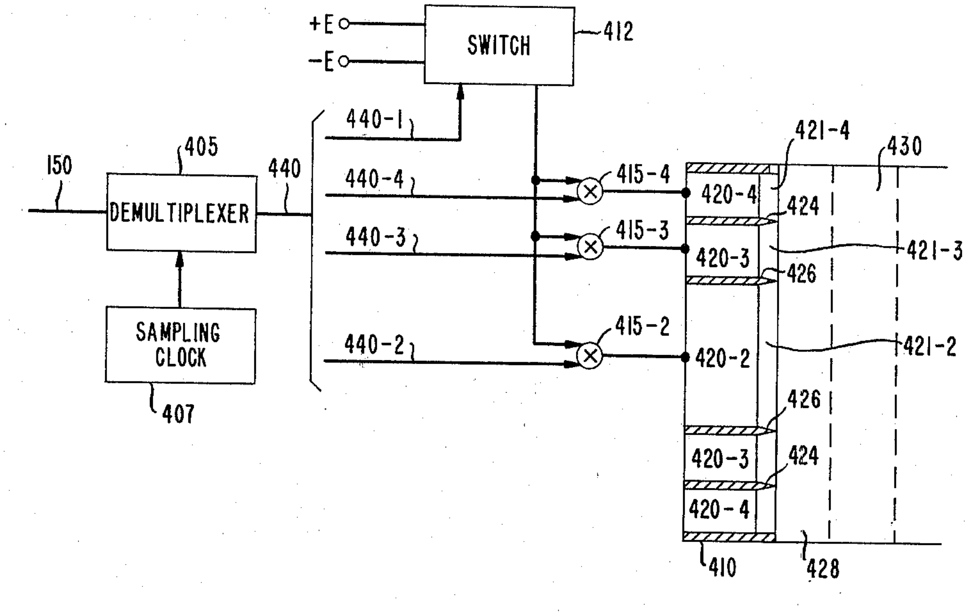
FIG. 4 shows a digital signal decoder adapted for use with the differential digital signal coding arrangement of FIG. 1.

Arrangements to decode the digital signal on channel 150 from multiplexor 145 may comprise conventional DPCM depending apparatus or use direct digital code to sound wave conversion as illustrated in FIG. 4. The circuit of FIG. 4 utilizes the type of sound converter described in FIG. 3 to provide direct sound wave output from a differential pulse code modulated signal. The coded signal on channel 150 is applied to demultiplexor 405 which is operative at the rate determined by sampling clock 407. Demultiplexer 405 rearranges the sequence of codes received by the circuit of FIG. 4 from channel 150 into a sequence of parallel codes corresponding to those obtained at the output of coder 130 in FIG. 1.

The output of demultiplexor 405 is applied to cable 440. Lead 440-1 of cable 440 carries the sign bit of the DPCM code. The signal on lead 440-2 corresponds to the output of gate 230-2. Similarly, the signal on lead 440-3 corresponds to the output of gate 230-3 in FIG. 2 and the signal on lead 440-4 corresponds to the output of gate 230-4 in FIG. 2. As described with respect to FIG. 3, sound converter 410 is cylindrical but may be of any suitable shape and includes electret sections 421-2, 421-3, and 421-4. Section 421-2 is circular and is surrounded by concentric ring electret sections 421-3 and 421-4. Electret section 421-4 is separated from section 421-3 by cylindrical wall 424 while electret section 421-3 is separated from section 421-2 by cylindrical wall 426. The radiating surface of electret section 421-2 is selected to be twice the radiating surface of electret section 421-3 and the radiating surface of electret section 421-3 is in turn twice the radiating surface of electret section 421-4. While a concentric cylinder arrangement is shown in FIG. 4, it is to be understood that other electret section arrangements may be used so long as the radiating areas are proportioned to weight the sound wave outputs in accordance with the significance of the code bits applied thereto.

In operation, the sign bit of each successive code is supplied to analog switch 412 which is responsive to a one pulse applied thereto to supply a +E signal to each of switches 415-2 through 415-4. A zero signal on lead 440-1 results in a −E voltage being applied to switches 415-2 through 415-4. Assume for purposes of illustration, that a code 1101 is applied to cable 440. The one bit in the sign position on lead 440-1 enables switch 412 to supply a +E voltage to gates 415-2 through 415-4. Lead 440-2 carries the most significant code elements. The one signal on lead 440-2 closes switch 415-2 so that the +E signal from output of switch 412 is applied to electret section 421-2 via conductive element 420-2. Responsive to the +E voltage, a pulse-like sound wave is radiated from section 421-2. This sound wave is isolated from sections 421-3 and 421-4 by cylindrical wall 426. The sound wave from section 421-2 then enters cylindrical section 428.

In like manner, the one signal on lead 440-4 allows the +E signal from the output of switch 412 to activate electret section 421-4 via switch 415-4 and conductive element 420-4 and a sound wave emanates from electret 421-4. Lead 440-4 carries the least significant code elements. Since the area of electret section 421-2 is 4 times that of section 421-4, the magnitude of the sound wave from section 421-2 is fourfold that from section 421-4. A zero signal appears on lead 440-3 whereby switch 415-3 remains open and no sound wave output is obtained from electret sections 421-3. The pulse-like sound waves from sections 421-2 and 421-4 are summed in cylindrical cavity 428 and the summed sound waves are lowpass filtered by means of the acoustic integrating circuit arrangement of filter cavity 430.

Filter cavity 430 may comprise one or more integrating type chambers adapted to remove the high frequency components of the summed sound waves from the electret sections. The output from filter cavity 430 responsive to the sequence of coded signals applied to converter 110 corresponds to the sound waves applied to the coding apparatus of FIG. 1 from source 100. Advantageously, the sound wave converter arrangement of FIG. 4 is substantially simpler than the electrical decoding arrangement of the prior art and does not require complex digital to analog converters or expensive high quality analog filters.

Figure 5:
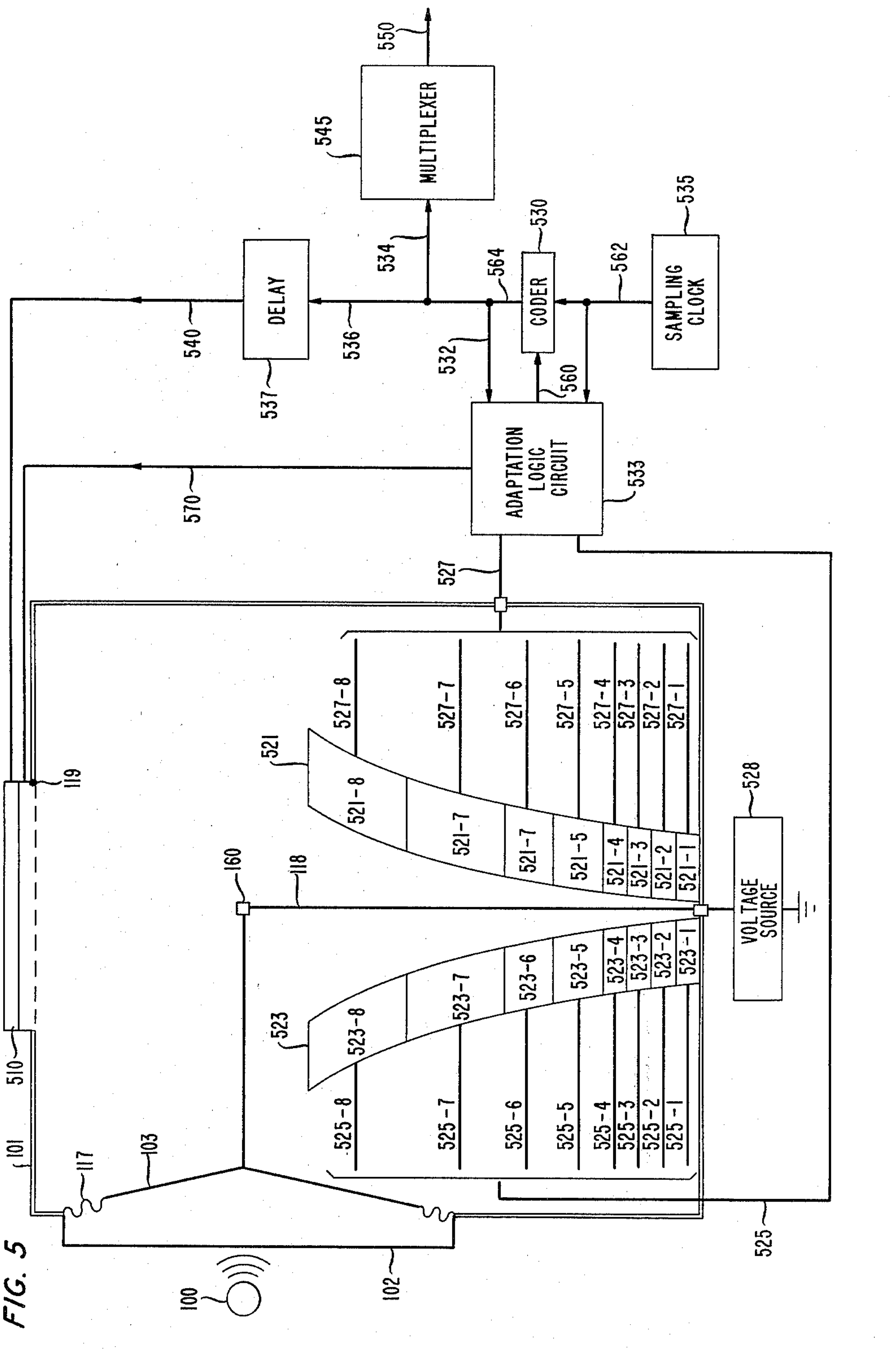
FIG. 5 depicts an adaptive digital signal coding arrangement illustrative of the invention.

FIG. 5 depicts a coding arrangement illustrative of the invention which provides adaptive pulse code modulation responsive to sound wave inputs. The arrangement of FIG. 5 includes chamber 101, vibratory diaphragm 103, acoustic converter 510, acoustic filter 102, ribbon 118, and segmented posts 521 and 523. These elements in FIG. 5 perform the same functions as their counterparts in FIG. 1. The conductive segments of post 521, however, vary in size in accordance with the desired adaptive characteristics. Segments 521-1 through 521-4 of post 121 form a set of equal sized conductive segments corresponding to a first adaptive step size. Segments 521-5 and 521-6 have contact lengths that are twice the lengths of segments 521-1 through 521-4 to provide operation in a second step size mode. In like manner, segments 521-7 and 521-8 each has a contact length twice the length of segment 521-5 or segment 521-6 to provide yet a third step size mode. Post 523 is symmetrical with respect to post 521 and includes segments arranged in the same manner as those on post 521.

Voltage source 528 supplies a +V voltage signal to elastic ribbon 118 which ribbon is deflected by the motion of vibratory diaphragm 103. The quantized signal outputs of the conductive segments are applied to adaptation logic circuit 533 via cables 525 and 527. Logic circuit 533 provides a succession of coded quantized signal codes jointly responsive to the voltages on cables 525 and 527 and the pulse signals from sampling clock 535. Coder 530 is adapted to convert each coded quantized signal from circuit 533 to a three bit adaptive code which adaptive code is supplied to multiplexor 545 via lines 564 and 534 and to delay 537 via leads 564 and 536.

As described with respect to FIG. 1, the delayed signals from delay 537 are converted into sound waves by converter 510 so that vibratory diaphragm 103 is responsive to the difference between sound waves applied via source 100 and the predictive sound waves from sound converter 510. The converter in FIG. 5, however, is modified to operate in response to the 3 bit adaptive codes from coder 530.

Adaptation circuit 533 is operative to receive the output codes of coder 530 and, responsive thereto, to select a step size for the succeeding quantized outputs of cables 525 and 527. Once the step size is selected in adaptation logic circuit 533, the outputs of cables 525 and 527 are selectively applied to coder 530. Initially, circuit 533 is set to provide a minimum step-size signal. Adaptation logic circuit 533 is shown in greater detail in FIG. 6.

Figure 6:
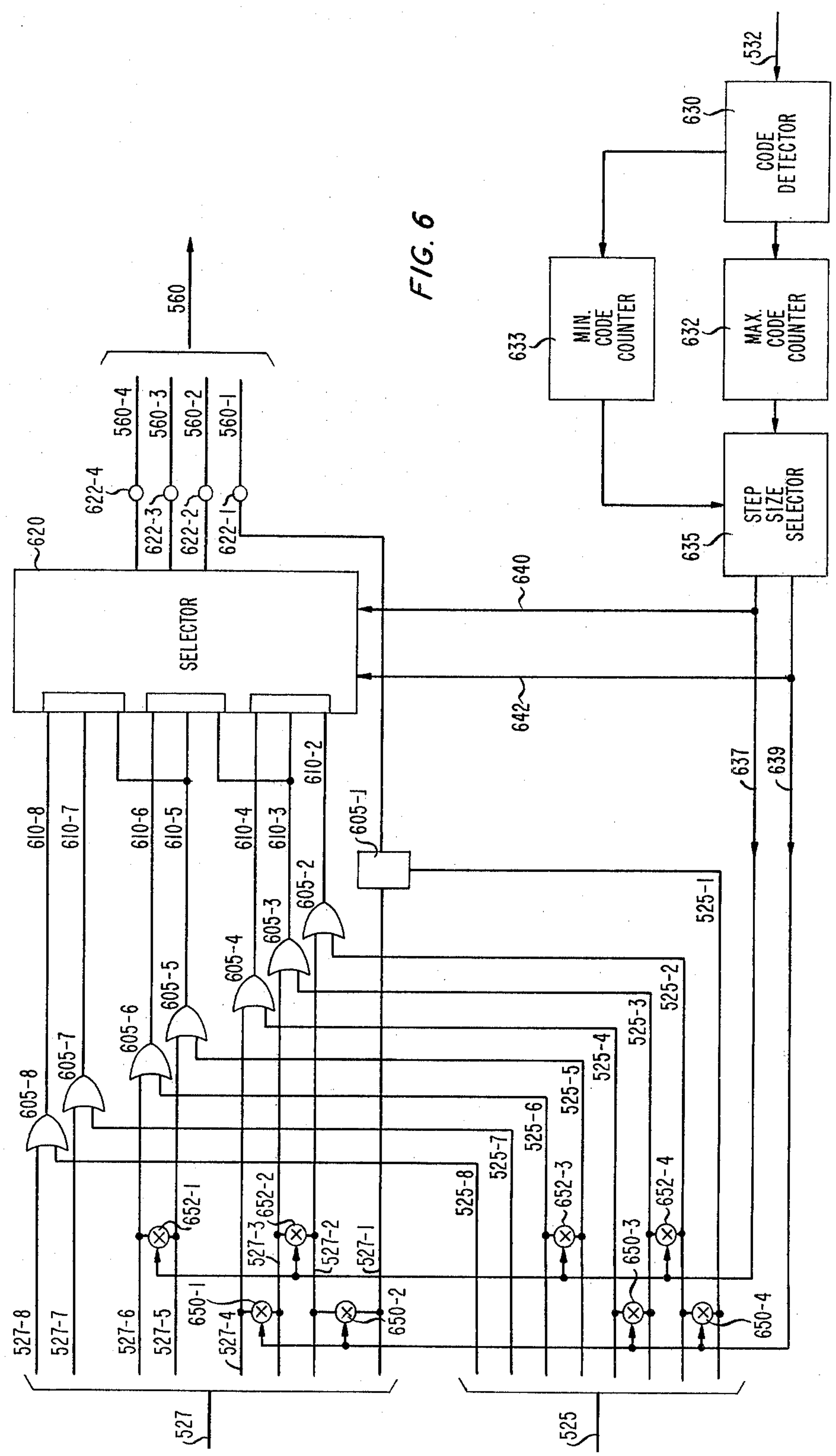
FIG. 6 shows an adaptation logic circuit useful in the adaptive digital signal coding arrangement of FIG. 5.

Referring to FIG. 6, code detector 630 is operative to inspect each code output from coder 530. Each time a maximum magnitude code is detected, i.e., "111" or "011", counter 632 is incremented. After a predetermined count is obtained, the state of step size selector 635 is altered so that the step size is increased. Similarly, a succession of minimum codes, i.e. "000" or "100", detected in code detector 630 causes counter 633 to provide a signal to step size selector 635 whereby the step size is reduced.

Assume, for purposes of illustration, that step size selector 635 is set to the smallest step size. Under these conditions, the output of step size selector 635 on leads 637 and 639 and 640 and 642 are zero signals. Selector 620 is responsive to the zero signals on leads 640 and 642 to connect leads 610-2, 610-3, and 610-4 to selector output terminals 622-2, 622-3, and 622-4, respectively. Switches 650-1 through 650-4 and 652-1 through 652-4 are placed in their open states responsive to the zero signals on leads 637 and 639. With step size selector 635 in its 00 state, only conductive segments 521-1 through 521-4 of post 521 and conductive segments 523-1 through 523-4 of conductive post 523 are operative to effect the formation of codes in coder 530.

Responsive to the 00 step size of selector 635, the output of segment 521-1 is connected to set input of flip-flop 605-1 via lead 527-1 and the output of segment 523-1 is connected to the reset input of flip-flop 605-1 via lead 525-1. When ribbon 118 contacts segment 521-1, flip-flop 605-1 is set and a one signal is obtained on lead 560-1. The one signal on lead 560-1 corresponds to the sign bit position of the quantized signal output on cable 525. The coded quantized signal on cable 560 is then 1000. In like manner, contact of ribbon 118 with segment 523-1 provides a zero output on lead 560-1 which zero output corresponds to a negative sign bit. With a zero signal on lead 560-1, the coded quantized signal on cable 560 is negative. The outputs of equal length segments 521-2 through 521-4 represent the quantized magnitude signals in step size 00. The largest quantized signal corresponds to the contact of ribbon 118 with each of segments 521-2 through 521-4 and the smallest quantized signal is representative of the contact of ribbon 118 with only segment 521-1. Equal length segments 523-1 through 523-4 serve the corresponding function for negative quantized signals.

TABLE 2

| Step Size | Quantized Signal From Cables 525 and 527 | Adaptation Logic 533 Quantized Output | Coder 530 Adaption Output |
|---|---|---|---|
| 00 | +3 | 1111 | 111 |
| 00 | +2 | 1011 | 110 |
| 00 | +1 | 1001 | 101 |
| 00 | 0 | { 1000<br>0000 | { 100<br>000 |
| 00 | −1 | 0001 | 001 |
| 00 | −2 | 0011 | 010 |
| 00 | −3 | 0111 | 011 |

Table 2 shows the quantized signal outputs on cables 525 and 527 and the corresponding outputs of adaption logic 533 and coder 530 for step size 00. When, for example, ribbon 118 is in contact with segments 121-1 and 121-2, a +V signal appears on each of heads 527-1 and 527-2. The quantized signal output on cable 527 is +1. Responsive to the +V voltage signal on lead 527-1, flip-flop 605-1 is set and a one signal is obtained on lead 560-1. A one signal also appears on lead 560-2 in response to the +V signal on lead 527-2. The output of adaptation logic 533 is then 1001 as shown in table 2.

Figure 7:
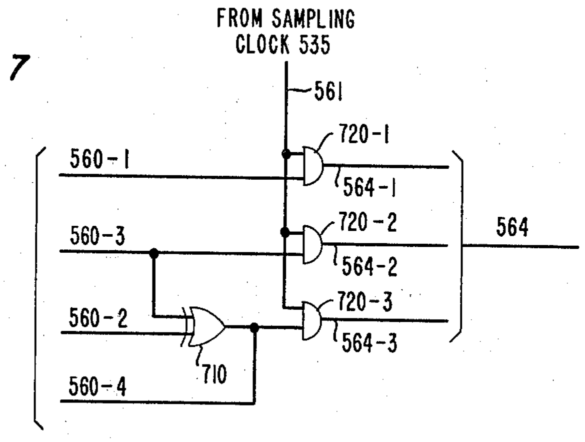
FIG. 7 shows a block of the digital coder used in FIG. 5.

Coder 530, shown in detail in FIG. 7, receives the one signals on leads 560-1 and 560-2 as well as the zero signals on leads 560-3 and 560-4. Upon the occurrence of the next sampling clock pulse from clock 535, a one bit appears at the output of AND-gate 720-1. Lead 560-2 carries a one signal while lead 560-3 carries a zero signal. Exclusive OR-gate 710 then enables gate 720-3 and a one bit is obtained therefrom but a zero bit appears on the output of gate 720-2. Consequently, a 101 coded signal appears on cable 564.

Figure 8:
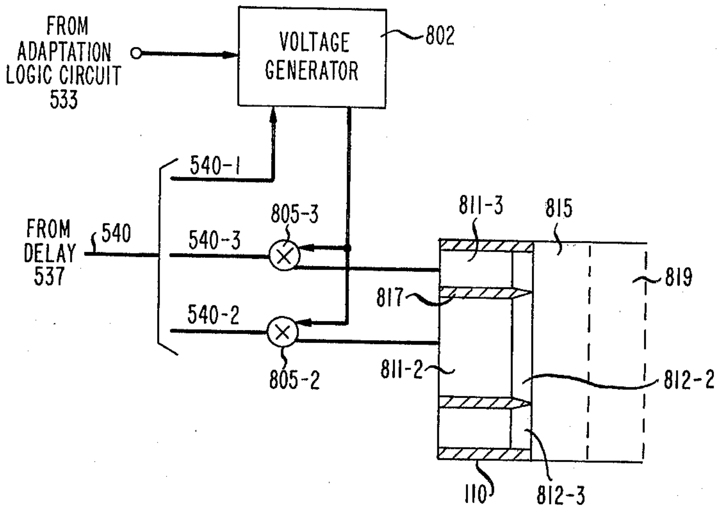
FIG. 8 shows a digital signal to sound-wave converter useful in the adaptive digital signal coding arrangement of FIG. 5.

After a one code delay in delay 537 the 101 code from coder 530 is applied to converter 510 via cable 540. The adaptation step size signal (00) from step size selector 635 is supplied to converter 510 via cable 570. The converter used in the adaptive coder in FIG. 5 is shown in greater detail in FIG. 8. Referring to FIG. 8, lead 540-1 which carries the sign bit of the code from delay 537 is connected to voltage generator 802. The step size signal on cable 570 is also connected to voltage generator 802. The magnitude of the voltage signal from generator 802 is determined by the current step size. Responsive to the lowest step size signal (00), the output of generator 802 is E. An intermediate step size signal (01) results in a 2E output from generator 802 and the highest step size signal (11) causes a 4E output from generator 802. The sign bit on lead 540-1 determines the polarity of the output of generator 802. A +E is obtained from generator 802 for step size 00 if the sign bit is 1 and a −E is obtained for step size 00 if the sign bit is zero.

The output of generator 802 is applied to switches 805-2 and 805-3. Responsive to the one bit on lead 540-2, the output of generator 802 is applied via switch 805-2 to conductive segment 811-2 and therefrom to one side of electret 812-2. A one bit on lead 540-3 closes switch 805-3 so that the output of generator 802 is applied to conductive segment 811-3 and therefrom to one side of ring cross section electret 812-3. For a 101 code on cable 540 and a 00 step size signal on cable 570, generator 802 provides a +E voltage which voltage is applied via switch 805-3 to electret 812-3. The pulse-like sound wave generated by electret 812-3 is integrated in cavity 819 and the resulting sound wave is radiated into chamber 101 as indicated in FIG. 5. The digital signal output of coder 530 thereby produces an integrated quantized sound-wave from converter 510. For a 101 coded signal and a 00 step size, the output of converter 510 corresponds to a +1 quantized signal. Larger step sizes result in much louder sound waves for a 101 code.

As long as the signals on leads 525-1 through 525-4 and 527-1 through 527-4 remain in the range of the step size provided, adaptation logic 533 continues in the 00 state. The detection of a predetermined succession of maximum code signals detected in code detector 630 causes step size selector 635 to be switched to its 01 state. In its 01 state, the outputs on leads 639 and 642 from step size generator 635 are ones and the outputs on leads 637 and 640 are zeros. In this 01 state, selector 620 is operative to connect leads 610-3, 610-5, and 610-6 to terminals 622-2, 622-3, and 622-4 respectively. The one signal on lead 639 turns on switches 650-1, 650-2, 650-3, and 650-4. In the 01 step size state, lead state 525-1 is connected to lead 525-2 via switch 650-4 while lead 525-3 is connected to lead 525-4 via switch 650-3. Similarly, leads 527-1 and 527-2 are connected together by switch 650-2 as are leads 527-3 and 527-4 by switch 650-1. In effect, segments 521-1 and 521-2 in FIG. 5 are made into a double length segment and segments 521-3 and 521-4 are made into a double length segment. In order to change from a quantized 0 signal to a quantized +1 signal ribbon 118 must be deflected so that it contacts segments 521-1, 521-2 and at least 521-3. In order to obtain a +2 quantized signal, ribbon 118 must further contact segments 521-4 and 521-5 and a quantized +3 signal is obtained only when ribbon 118 contacts segments 521-1 through 521-6. With respect to post 523, segments 523-1 and 523-2 become one double length segment and segments 523-3 and 523-4 also become one double length segment. In this manner, larger deflections of ribbon 118 are required for each coded output and the quantitization is coarser.

In the 01 step size state, the deflection of ribbon 118 to contact segments 521-1 and 521-2 causes a one signal to set flip-flop 605-1. A one bit is thereby obtained on lead 560-1. Contact with segments 521-3 and 521-4 results in a one signal appearing on lead 560-2 and contact of the ribbon with segment 521-5 results in a one signal appearing on lead 560-3. Since segment 521-6 is isolated from segment 521-5, no voltage appears on lead 527-6 so that a zero signal appears on lead 560-4.

The signals from selector 620 are transmitted to coder 530 via cable 560. The coder of FIG. 7 produces a three bit adaptive digital code responsive to the coded quantized signal on cable 560. The signals on leads 560-1 through 560-4 are representative of the quantized signal from posts 521 and 523 modified by the adaptation in adaptation logic circuit 533. As previously described, contact of ribbon 18 with segments 521-1 through 521-5 while the step size signal from selector 635 is 01 results in one signals on leads 560-1 through 560-3 and a zero signal on lead 560-4. The one signal on lead 560-1 enables one input of AND-gate 720-1. The one signal on lead 560-3 enables one input of gate 720-2. The one signals on leads 560-2 and 560-3 cause a zero output to be obtained from exclusive OR-gate 710. Consequently gate 720-3 receives an inhibiting input. Responsive to the next pulse from sampling clock 535 on lead 562 a one code bit is obtained from each of gates 720-1 and 720-2 while a zero code bit is obtained from gate 720-3. The output codes from coder 530 are applied to multiplexor 545, delay 537, and adaptation logic 533. Table 3 shows the quantized signal output from posts 521 and 523, the resulting coded quantized signal output of adaptation logic circuit 533 and the codes obtained from coder 530 for step size 01. The quantized signals ±1′ are twice the quantized signals ±1 of table 2. Similarly, quantized signals ±2′, and ±3′, are twice ±2 and ±3 of table 2.

TABLE 3

| Step Size | Quantized Signal From Cables 525 and 527 | Adaptation Logic 533 Quantized Output | Coder 530 Adaptive Output |
|---|---|---|---|
| 01 | +3′ | 1111 | 111 |
| 01 | +2′ | 1011 | 110 |
| 01 | +1′ | 1001 | 101 |
| 01 | 0 | { 1000<br>0000 | { 100<br>000 |
| 01 | −1′ | 0001 | 001 |
| 01 | −2′ | 0011 | 010 |
| 01 | −3′ | 0111 | 011 |

In the event that a predetermined number of maximum value codes are detected in code detector 630 while step size selector 635 is in the 01 state, an output is obtained from code counter 632. The output of code counter 632 is effective to switch step size selector to its 11 state. Selector 635 provides a one signal on each of leads 637, 639, 640, and 642 in its 11 state. Consequently, each of switches 650-1 through 650-4 and 652-1 through 652-4 is closed. In effect, sequences 521-1 through 521-4 are connected as one four length segment through switches 650-1, 652-2 and 650-2. Segments 521-5 and 521-6 are connected together as one four length segment through switch 652-1. Similarly sections 523-1 through 523-4 are connected together to form a four length segment via switches 650-3, 652-4, and 650-4 and segments 523-5 and 523-6 form one four length segment through switch 652-3. Selector 620 is responsive to the one signals on leads 640 and 642 to connect leads 610-5, 610-7, and 610-8 to selector output leads 560-2, 560-3, and 560-4 respectively.

Leads 527-1 through 527-4 are connected to the set input of flip-flop 605-1 and leads 525-1 through 525-4 are connected to the reset input of flip-flop 605-1. While adaptation logic circuit 533 is in its 11 state, deflection or ribbon 118 to contact shorted segments 521-1 through 521-4 produces a positive sign bit signal on lead 560-1, while contact of ribbon 118 with shorted segments 523-1 through 523-4 produces a negative sign bit signal on lead 560-1. Contact of ribbon 118 with segment 521-5 or segments 521-5 and 512-6 results in a one signal on lead 610-5 which one signal is transmitted through selector 620 to lead 560-2. Further deflection of ribbon 118 to contact segment 527-7 produces a one signal on lead 527-7 which lead is connected to lead 560-3 via selector 620. Similarly, contact of ribbon 118 with segment 521-8 produces a one signal on lead 560-4. Table 4 lists the quantized signals from posts 521 and 523, the coded quantized signal from adaptive logic 533 and the adaptive codes from coder 530 for the 11 step size. As is readily seen from table 4 and FIGS. 5 and 6, a quantized signal is obtained on cable 560 responsive to the vibratory motion of diaphragm 103 over the entire range of contact between ribbon 118 and posts 521 and 523. The quantized signal ±1″ of table 4 is twice the value of quantized signal ±1′ in table 3. Quantized signals ±2″ and ±3″ in table 4 are twice the values of quantized signals ±2′ and ±3′ of table 3.

TABLE 4

| Step Size | Quantized Signal From Cables 525 and 527 | Adaptation Logic 533 Quantized Output | Coder 530 Adaptive Output |
|---|---|---|---|
| 11 | +3″ | 1111 | 111 |
| 11 | +2″ | 1011 | 110 |
| 11 | +1″ | 1001 | 101 |
| 11 | 0 | { 1000<br>0000 | { 100<br>000 |
| 11 | −1″ | 0001 | 001 |
| 11 | −2″ | 0011 | 010 |
| 11 | −3″ | 0111 | 011 |

As described with respect to step sizes 00 and 01, the quantized signal on cable 560 is applied to coder 530 which coder converts the quantized signal into a three bit adaptive code. If, for example, the quantized signal on cable 560 is a 1111 code corresponding to contact between ribbon 118 and segment 521-1 through 521-8, one signals appear on each of leads 560-1 through 560-4. Upon occurrence of the next sampling clock pulse from clock 535 on lead 561, AND-gate 720-1 produces a one sign bit, AND-gate 720-2 produces a one bit responsive to the high signal on lead 560-3, and AND-gate 720-3 produces a one bit responsive to the high signal on lead 560-4. As shown in table 4, the quantized signal +3″ corresponds to quantized adaptive logic 533 output 1111, and to the coder 530 output 111.

Figure 9:
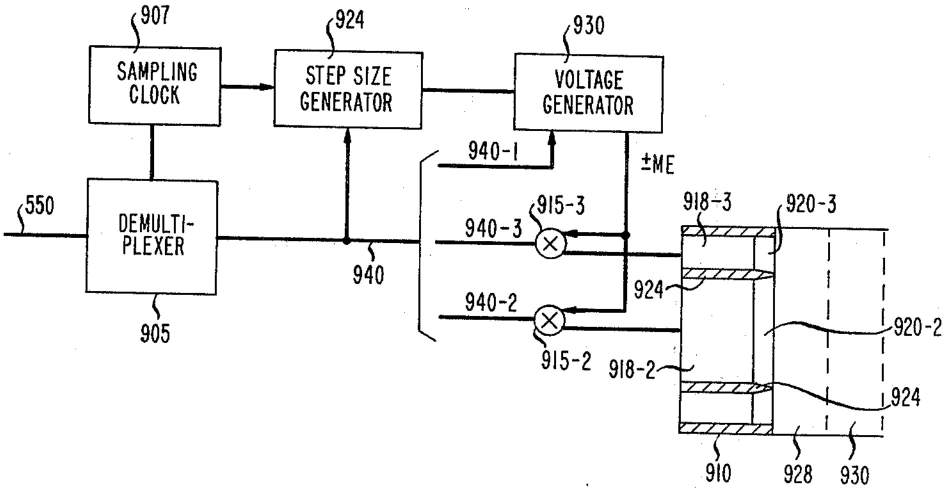
FIG. 9 depicts an adaptive digital signal decoder that may be used with the adaptive digital signal coding arrangement of FIG. 5.

The adaptive code output from coder 530 is supplied to channel 550 via multiplexor 545 at a rate determined by sampling clock 535. While any of the well known adaptive decoding arrangements may be utilized to produce sound waves from the adaptive code sequence on channel 550, the decoder arrangement of FIG. 9 provides direct digital code to sound wave conversion. In FIG. 9, the adaptive code sequence is received by demultiplexor 905. Each adaptive code from multiplexor 905 is applied to cable 940 and is further applied to step size generator 924. The sign bit of the adaptive code appears on lead 940-1 and is effective to control the polarity of the output voltage from voltage generator 930. A one bit causes a positive voltage output from generator 930 and a zero sign bit produces a negative output voltage from generator 930.

Step size generator 924 receives the successive adaptive codes from multiplexor 905 and is operative to detect successions of maximum or minimum codes. Responsive to a predetermined succession of maximum codes, the step size is increased. Responsive to a predetermined sequence of minimum codes, the step size is decreased. Voltage generator 930 is operative to produce voltages ±E, ±2E or ±4E in accordance with the step size and sign signals applied to generator 924. The minimum step size signal (00) causes the output of the voltage generator output to be of magnitude E. The intermediate step size signal (01) increases the voltage magnitude to 2E, and the maximum step size signal (11) further increases the voltage magnitude to 4E.

Digital signal to acoustic converter 910 provides sound wave outputs directly responsive to the adaptive codes on cable 940. Converter 910 includes circular electret element 920-2 and concentric ring electret element 920-3. The area of electret 920-2 is arranged to be twice the area of electret ring 920-3 so that the sound outputs are weighted in accordance with the significance of the bit positions of the adaptive code. Cylindrical wall 924 isolates electret 920-2 from electret 920-3 whereby independent sound waves are produced in the electrets. Cavity 928 in converter 910 permits the separate sound outputs of electrets 920-2 to be summed with the sound outputs of electret 920-3. The summed sound output in cavity 928 exhibits a distinct pulse-like effect which effect is removed by passage of the summed sound wave through acoustic filter cavity 930. Cavity 930 is designed to remove high frequency components from the sound wave radiated therethrough whereby only the frequency components below one-half the sampling frequency of the system are permitted to radiate from filter cavity 930.

Assume for purposes of illustration that the adaptive code 011 appears on cable 940. The zero sign bit on lead 940-1 causes the polarity of voltage generator 930 to be negative. For a minimum step size signal 00 from step size generator 942 the output of voltage generator 930 is −E. The one signal on lead 940-2 allows the −E signal from voltage generator 930 to pass through switch 915-2 and to be applied to conductive segment 918-2 of converter 910. In this manner a −E signal is applied to electret 920-2 which electret produces a pulse-like sound wave. In similar manner the one signal on lead 940-3 closes switch 915-3 and a −E signal is applied to electret 920-3 via conductive segment 918-3. The resulting sound wave in cavity 928 is proportional to −3E in accordance with the adaptive code. For a 01 step size signal, the sound wave is proportional to −6E responsive to the 011 code on cable 940. In like manner, 11 step size results in a sound wave proportional to −12E responsive to the 011 code on cable 940.

While the invention has been described in terms of particular embodiments thereof, it is to be understood that modifications and alternative constructions may be made by those skilled in the art without departing from the spirit and scope of the invention. For example, the conductive post arrangement for detection of the deflection of movable ribbon in FIGS. 1 and 5 may be replaced by semiconductor, piezoelectric, or other type proximity detecting devices or optical detectors employing photosensitive semiconductors.

I claim:

1. Apparatus for converting sounds into coded digital signals comprising a closed chamber having at least first and second apertures therein;
   - a vibratory diaphragm having its periphery fastened to the periphery of said first aperture;
   - means for applying a first sound wave to said diaphragm from outside said chamber;
   - means responsive to the motion of said diaphragm for generating a quantized signal representative of the diaphragm motion;
   - and means responsive to the quantized signal for producing a coded digital signal;

CHARACTERIZED IN THAT means (110) connected to said chamber (101) at the second aperture (119) are adapted to convert said coded digital signal into a second sound wave and to direct said second sound wave into said chamber to modify the motion of said diaphragm (103); said produced digital signal corresponding to the difference between said first and second sound waves.

2. Apparatus for converting sounds into coded digital signals according to claim 1 further

CHARACTERIZED IN THAT means (137) connected between said producing means (130) and said converting means (110) are adapted to delay said coded digital signal applied to said converting means (110) whereby said coded digital signal is a differential coded digital signal corresponding to said first sound wave.

3. Apparatus for converting sounds into coded digital signals according to claim 2 further

CHARACTERIZED IN THAT said digital signal converting means (110) comprises: means (eg 321-2) responsive to each coded digital signal element for generating a sound wave corresponding thereto; means (328) for summing the sound waves from all the sound wave generating means (321-2, 321-3, 321-4); means (330) for restricting the frequency range of the summed sound waves, and means (112) for directing the restricted frequency sound wave into said chamber through said second aperture (119).

4. Apparatus for converting sounds into coded digital signals according to claim 3, further

CHARACTERIZED IN THAT each sound wave generating means comprises an electret (eg 321-2), the area of said electret (eg 321-2) corresponding to the significance of the coded digital signal element applied thereto, and means (322, 324, 326) for isolating each electret from the other electrets of the sound wave generating means (110).

5. Apparatus for converting sounds into coded digital signals according to claim 4 further

CHARACTERIZED IN THAT said quantized signal producing means comprises
   - a movable element (118) coupled to said diaphragm (103) adapted to alter position responsive to the motion of said diaphragm (103);
   - and at least one fixed element (eg 121) adapted to detect the position of said movable element;
   - said fixed element (121) being partitioned into a series of discrete position detecting segments (121-2 through 121-8); and
   - means (127) connected to said position detecting segments (121-1 through 121-8) for forming a quantized signal representative of the position of said movable element (118).

6. Apparatus for converting sounds into coded digitals signals according to claim 5 further

CHARACTERIZED IN THAT said quantized signal forming means comprises means (630, 632, 633, 635) responsive to said produced coded digital signals for generating an adaptive step size signal, and means (620, 650-1 through 650-4, 652-1 through 652-4) responsive to said adaptive step size signal for selectively interconnecting said discrete position detectors to produce an adaptive quantized signal.

7. Apparatus for converting sounds into coded digital signals according to claim 6 further

CHARACTERIZED IN THAT said coded digital signal converting means comprises means (802) responsive to said adaptive step size signal for selectively controlling the intensity of the sound waves produced by each electret.

8. Apparatus for converting sounds into coded digital signals according to claim 5, further

CHARACTERIZED IN THAT said movable element comprises a ribbon-shaped flexible member (118) having one end fixed to and extending substantially perpendicular from one wall of said chamber (101), means (115) connected between said diaphragm and said ribbon-shaped flexible member responsive to the motion of said diaphragm for deflecting said ribbon-shaped member; said fixed element (eg 121) being curved strip elements mounted on said one wall in said chamber adapted to detect the deflections of said ribbon-shaped member (118); said curved strip elements (121) being symmetrically disposed about the undeflected position of said ribbon-shaped flexible element (118); each curved strip element (121) being partitioned along its length into a series of proximity detecting segments (121-1 through 121-8), said quantized signal forming means comprising means (127) responsive to the number of proximity detecting segments in contact with said deflected ribbon element for generating a quantized signal corresponding to said ribbon-shaped flexible element deflection.

9. Apparatus for converting sounds into coded digital signals according to claim 8, further

CHARACTERIZED IN THAT each curved strip element (eg 121) is partitioned into a series of substantially equal length proximity detecting segments (121-1 through 121-8) along said curved strip element length.

10. Apparatus for converting sounds into coded digital signals according to claim 8, further

CHARACTERIZED IN THAT each curved strip element (eg 121) is partitioned into a series of different length proximity detecting segments (121-1 through 121-8) along said curved strip element length.

11. Apparatus for converting sounds into coded digital signals according to claim 9 or claim 10 further

CHARACTERIZED IN THAT said quantized signal forming means comprises means (630, 632, 633, 635) responsive to said produced coded digital signals for generating an adaptive step size signal, and means (620, 650-1 through 650-4 and 652-1 through 652-4) for selectively interconnecting said proximity detecting segments to produce an adaptive quantized signal.

12. Apparatus for converting sounds into coded digital signals according to claim 8, claim 9 or claim 10 further

CHARACTERIZED IN THAT said ribbon-shaped member (118) is a flexible conductive member; each proximity detecting segment (eg 121-1) is a conductive segment; and said quantized signal forming means comprises means (128) for applying a first signal to the flexible conductive member; means (eg 127) responsive to the number of conductive segments from which said first signal is obtained for generating a signal representative of the deflection of said flexible conductive member.

13. A digital speech communication system comprising a closed chamber having at least first and second apertures therein;

a vibratory diaphragm with its periphery secured to the periphery of said first aperture;

means for applying a speech wave to said vibratory diaphragm from outside said closed chamber;

means responsive to the motion of said vibratory diaphragm for producing a quantized signal representative of said diaphragm motion;

means responsive to said quantized signal for producing a coded digital signal;

means covering said second aperture for converting said coded digital signals into sound waves and for radiating said sound waves into said chamber to modify the motion of said diaphragm, said coded digital signal producing means producing a differential coded digital signal corresponding to said speech wave.

14. A digital speech communication system according to claim 13 further comprising means for receiving said differential coded digital signal; and means for transforming said received differential coded digital signal into a speech wave; said transforming means including means responsive to each coded digital signal element for generating a sound wave corresponding to said element; means for summing the sound waves from all the sound wave generating means; and means for restricting the frequency range of said summed sound waves to correspond to the frequency range of the speech wave applied to said vibratory diaphragm.

15. A digital speech communication system according to claim 14 wherein said converting means comprises means responsive to each coded digital signal element for generating a sound wave corresponding to said signal element; means for summing the sound waves from said sound wave generating means; means for restricting the frequency range of said summed sound waves; and means for directing said frequency restricted summed sound waves into said chamber through said second aperture.

16. A digital speech communication system according to claim 15 wherein said quantized signal producing means comprises a movable element coupled to said diaphragm adapted to alter position responsive to the movement of said diaphragm, and means for detecting the position of said movable element; said detecting means being partitioned into a series of discrete position detecting elements; and means connected to said position detecting elements for forming a quantized signal representative of the position of said movable element.

17. A digital speech communication system according to claim 16 wherein said quantized signal forming means comprises means responsive to the coded digital signals for generating a quantized signal adaptation control signal; and means responsive to said adaptation control signal for selectively interconnecting said discrete position detecting elements to produce an adaptive quantized signal.

18. A digital speech signal communication system according to claim 17 wherein said transforming means further comprises means responsive to the received differential coded digital signals for generating an adaptation signal; means responsive to said adaptation signal for controlling the intensity of the sound waves produced by each sound wave generating means of said transforming means.

19. A digital speech signal communication system according to claim 18 wherein said coded digital signal converting means comprises means responsive to said adaptation control signal for selectively controlling the intensity of the sound waves produced by each sound wave generating means of said converting means.

20. A digital speech communication system according to claim 19 wherein each sound wave generating means comprises an electret, the sound generating area of said electret corresponding to the significance of the digital signal element applied thereto; and means for isolating each electret from the other electrets.

21. A digital speech communication system according to claim 20 wherein said movable element comprises a deflectable strip member having one end fixed to and extending from one wall of said chamber; means coupled between said diaphragm and said deflectable strip element for deflecting said strip element responsive to the motion of said diaphragm; said means for detecting the position of said deflectable strip member comprising a pair of fixed strip elements symmetrically disposed about the undeflected position of said deflectable strip element; each fixed strip element being partitioned along its length into proximity detecting segments; and said quantized signal forming means comprising means responsive to the number of proximity detecting segments in contact with said deflectable strip element for generating a quantized signal corresponding to the deflection of said deflectable strip element.

22. Apparatus for converting coded digital signals into sound comprising a cylindrical electret, at least one insulative cylindrical wall, the first insulative cylindrical wall being concentric with and surrounding the cylindrical electret, at least one ring electret, the first ring electret being concentric with and surrounding the first insulative cylindrical wall, the successive ring electrets each being concentric with and surrounding one of the insulative cylindrical walls, said electrets and insulative walls forming an assembly having a sound emitting end with each electret being acoustically isolated from the other electrets, means for selectively applying coded digital signal elements to said acoustically isolated electrets, a first cavity extending from said sound emitting end adapted to acoustically sum sound waves from the acoustically isolated electrets, and a second cavity extending from said first cavity adapted to restrict the frequency range of the summed sound waves.

23. Apparatus for converting coded digital signals into sound comprising:

a cylindrical electret, a first insulative cylindrical wall concentric with and surrounding the cylindrical electret, a first ring electret concentric with and surrounding the first insulative cylindrical wall, the area of the first ring electret being one-half the area of the cylindrical electret, a second insulative cylindrical wall concentric with and surrounding the first ring electret, a second ring electret concentric with and surrounding the second insulative wall, the area of the second ring electret being one-half the area of the first ring electret, said electrets and insulative walls forming an assembly having a sound emitting end with each electret being acoustically isolated from the other electrets, a cylindrical cavity contiguous to said sound emitting end adapted to acoustically sum sound waves from the acoustically isolated electrets, and an acoustical filter adjacent to the sound wave summing cavity adapted to remove frequency components of the summed sound waves above the sampling frequency of the digital signals.

* * * * *